Aug. 4, 1964  A. L. ROBERTS ETAL  3,142,958
BAROMETRICALLY RESPONSIVE POWER CONTROL MECHANISM
Filed June 27, 1961  3 Sheets-Sheet 1
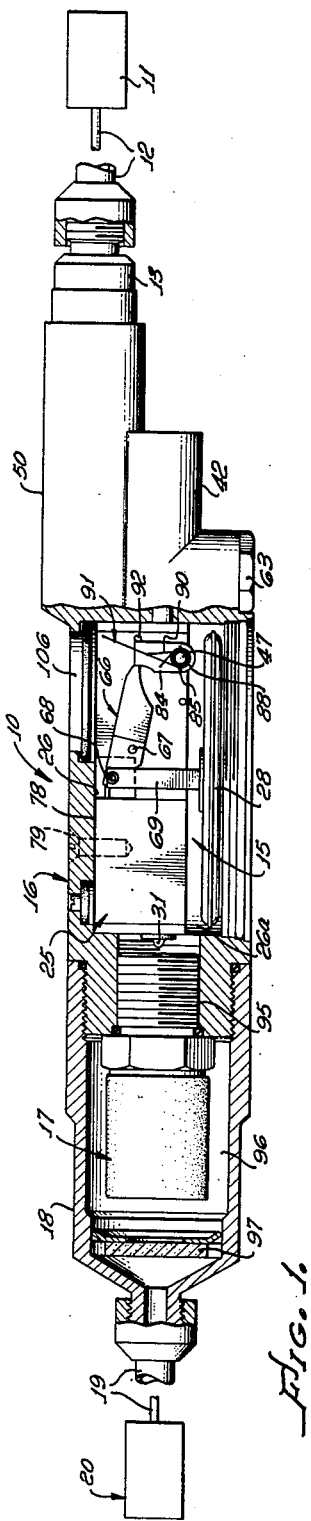
INVENTORS.
ALBERT L. ROBERTS
JAMES P. O'DONNELL
BY
ATTORNEY.

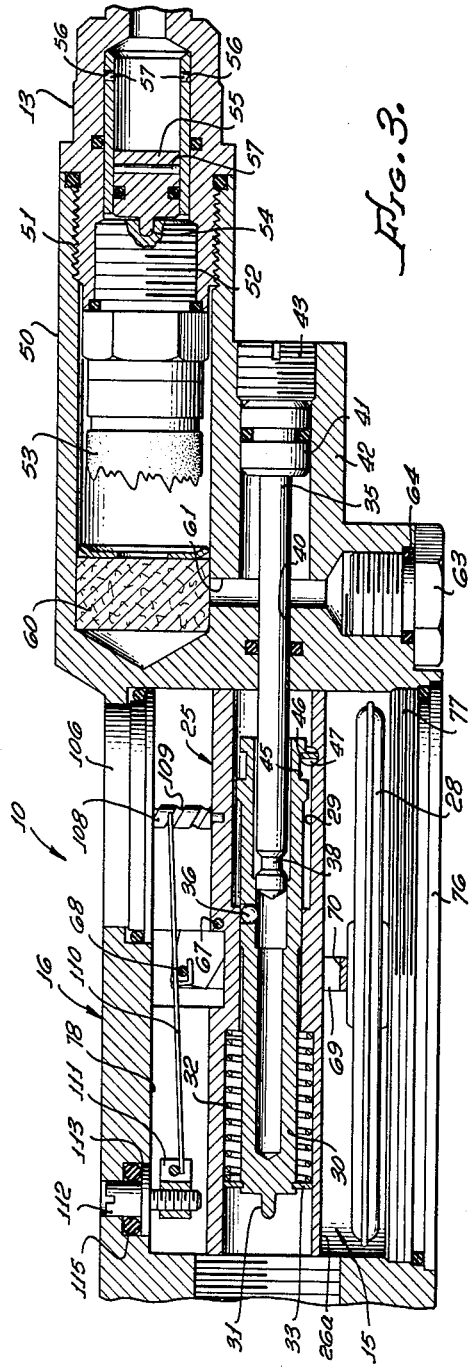

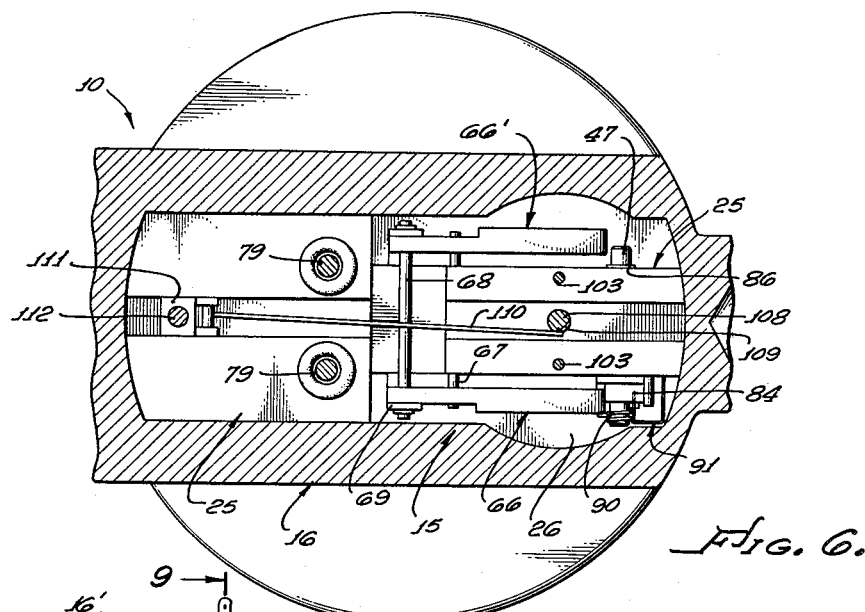
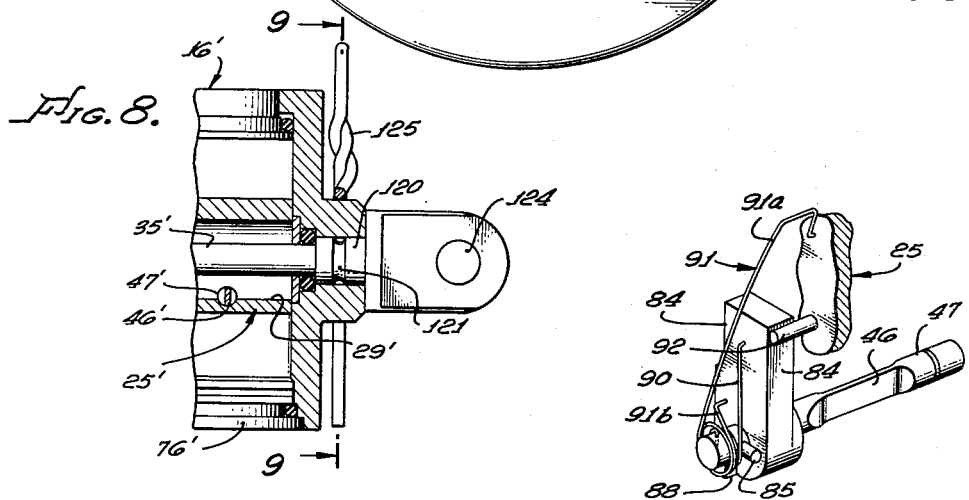
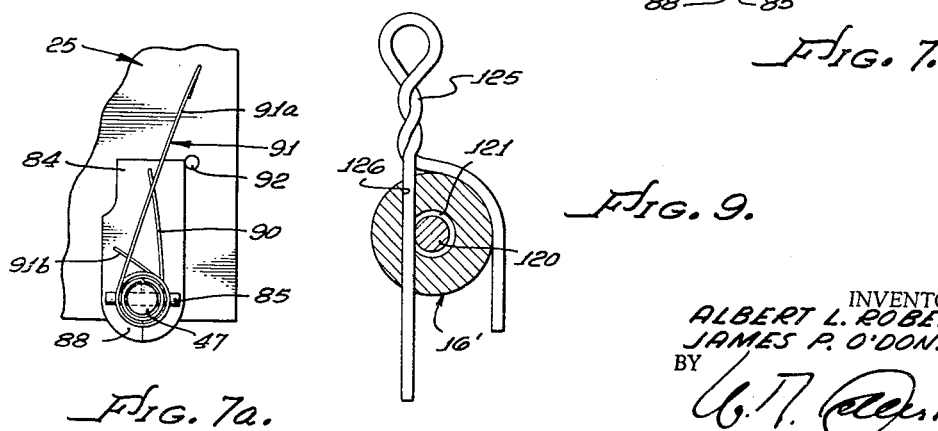

United States Patent Office 3,142,958
Patented Aug. 4, 1964

3,142,958
BAROMETRICALLY RESPONSIVE POWER
CONTROL MECHANISM
Albert L. Roberts, Torrance, and James P. O'Donnell,
Van Nuys, Calif., assignors to Ordnance Associates,
Inc., South Pasadena, Calif., a corporation of California
Filed June 27, 1961, Ser. No. 119,897
19 Claims. (Cl. 60—26.1)

This invention relates to self-activating space devices and more particularly to a power unit controlled by a pressure responsive relay and sometimes referred to as a barometic initiator, and is operable to release or control stored energy automatically at a predetermined altitude, and if desired, after a predetermined lapse of time.

There are may situations in which it is desirable to perform work automatically at a particular altitude or under other predetermined conditions such as a predetermined time delay. For example, it is often desirable to open a parachute after the load to which it is attached has fallen freely for a specified distance or has safely cleared the object from which it was jettisoned, or until the increase in the barometric pressure indicates the load is at an altitude at which it is desired to have the parachute open.

In other operating environments of space mechanisms, it is desirable to have the work performing device remain inactive for a predetermined length of time after being armed or conditioned for activation in response to an activating force. Heretofore, various control mechanisms have been relied upon to initiate operation of the power means proper, as for example, precision time delay fuses mechanical timing devices, electrical timers, and others. However, such devices are subject to many drawbacks, including such serious matters as the adverse effects of inertia and gravity upon the operation of components used in space flight craft, the difficulty of activating such devices by remote control to initiate operation of the power unit in even a rough approximation of a desired distance from the earths's surface, the likelihood of partial or disabling damage to the components in orindary handling and particularly when subjected to shock and vibration conditions involved in space travel and the ejection of delicate timing mechanisms from craft traveling at high speed, and numerous other matters of a like or related nature.

The mechanism of the present invention overcomes the foregoing and other disadvantages of previously proposed initiators and utilizes as its principal component a precision pressures-senitive relay of very simple, rugged design constructed to release the stored energy or to initiate operation of a pre-conditioned power source at a selected altitude evidenced by a characteristic barometic pressure, as distinguished from elapsed time. Where timing is an important consideration, the invention mechanism is utilized to initiate operation of timing means of a type immune to effects of shock, sudden changes in velocity, vibration and other adverse factors, and arranged to initiate release or operation of the main power source. For example, the timer may be of the pyrotechnic type comprising an explosive charge specially compounded and designed to generate a source of pressurized gas after a predetermined time interval and having a detonator arranged to be activated by the barometric responsive relay of this invention. The resulting energy generated within an enclosed space is then utilizable to perform useful work. The energy of the generated gas may be utilized directly to perform work or it may serve merely to rupture a closure device thereby to release and make available for use a much larger store of pressurized gas. Alternatively, the generated gas pressure may be used to operate switches, pistons, pneumatic motors and other similar devices of a great variety of types. Inasmuch as the particular work need or the equipment utilized to perform work forms no part of the present invention, further reference or description of these is not necessary.

In view of the foregoing, it is the primary object of the present invention to provide a new and useful self-contained mechanism highly resistant to inertia, change of speed, vibration and other adverse operating conditions and operating with certainty and reliability to initiate work performing operations upon the occurrence of predetermined pressure conditions.

Another object of the invention is the provision of a simple, rugged, high-reliability, light-weight pressure responsive relay device which operates with certainty while traveling at either high or low velocity in space.

Another object of the invention is the provision of a self-contained power unit incorporating therein a precision barometic type relay device operable to activate the power unit under predetermined conditions.

Another object of the invention is the provision of a barometric initiator employing a high sensitivity, pressure-responsive relay mechanism operable to release a main power source, such as a firing pin for an explosive charge effective when fired to generate pressurized gas capable of producing useful power.

Another object of the invention is to provide a pressure responsive relay having an aneroid cell arranged to release stored energy operable in turn to initiate a further work producing force after a predetermined timed lapse.

Another object of the invention is the provision of a normally disarmed, de-activated work-producing initiator adapted to be released by a pressure sensitive relay device and incorporated means for cocking the relay automatically as an incident to the occurrence of another event occurring within an air or space craft.

Another object of the invention is the provision of a self-contained highly-reliable, sensitive, yet rugged relay instantly responsive to a predetermined ambient pressure to initiate operation of any of a wide variety of components with which said relay is adapted to be associated.

These and other more specific objects will appear upon reading the following specification and claims and upon considering in connection therewith the attached drawings to which they relate.

Referring now to the drawings on which preferred embodiments of the invention are illustrated.

FIGURE 1 is a side elevational view of one preferred embodiment of a self-contained unit incorporating the pressure responsive relay mechanism of the present invention in a typical operating environment, portions of the unit being broken away to show constructional details;

FIGURE 2 is a partial, longitudinal sectional view on an enlarged scale through the unit showing the position of the parts before arming;

FIGURE 3 is a sectional view similar to FIGURE 2 but showing the relay mechanism armed;

FIGURE 4 is a transverse sectional view taken along line 4—4 on FIGURE 2;

FIGURE 5 is a transverse fragmentary view taken along line 5—5 on FIGURE 2;

FIGURE 6 is a partial longitudinal section taken along line 6—6 on FIGURE 2;

FIGURE 7 is a fragmentary perspective view of the relay sear and the biasing springs operatively associated therewith;

FIGURE 7a is a fragmentary elevational view on an enlarged scale of a portion of the trigger mechanism;

FIGURE 8 is a fragmentary longitudinal sectional view of an alternate arming mechanism for the relay; and FIGURE 9 is a transverse sectional view taken along line 9—9 on FIGURE 8 showing the safety pin in place and safe-guarding against unintended arming of the relay mechanism.

Referring to FIGURES 1 and 2, initially, there is shown a preferred embodiment of the present invention designated generally 10 the device there shown being designed for automatic arming of the pressure sensitive relay while the device is traveling in space or is otherwise in an environment subject to an ambient pressure below that to which the relay device is responsive. An example of a typical operating environment for device 10 is indicated somewhat schematically in FIGURE 1 where the relay is arranged to be armed automatically as an incident to the generation of power in a pilot seat ejector mechanism 11. The seat ejecting pressure is conveyed through conduit 12 in cylinder 13 where it is effective to activate the arming device to arm the pressure sensitive relay device 15. The parachute ejected along with the pilot and his seat is then held partially shrouded until the entire package has fallen through space to a predetermined altitude at which the atmospheric pressure is effective to activate the pressure sensitive relay 15. Such activation is effective to fire an explosive charge 17 housed in chamber 18 with the result that the generated pressure is useable in device 20 to operate a cutter to sever the loop encircling the parachute shrouds. The severing of this loop at the predetermined altitude allows the parachute to blossom and convey the attached load safely to earth. With the foregoing general description of the invention device in mind reference will be had particularly to FIGURES 2 and 3 for a detailed understanding of the pressure sensitive relay device 15 and its operative relationship to the arming device and to the work performing components activated thereby.

Relay 15 is a self-contained assembly having a rigid main body 25 extending lengthwise of a cavity 26 within main body 16 of device 10. Cavity 26 is generally T-shaped in cross-section and its stem portion opens into a generally circular chamber 26a housing a disc-like aneroid cell 28 constituting the pressure sensing means of relay 15.

Main body 25 of the relay has a through bore 29 extending lengthwise thereof and having a reduced diameter section in its mid-portion slidably supporting a tubular hammer 30 provided with a firing pin 31 at its forward or left-hand end as viewed in FIGURE 2. Hammer 30 is urged to the left by a stiff compression spring 32 having one end bearing against a split ring keeper 33 carried by the forward end of the hammer and its opposite end bearing against a shoulder centrally of bore 29. As shown in FIGURE 2, hammer 30 is in its released or extended position.

Hammer 30 is cocked or armed by means of an arming pin 35 held detachably coupled to the hammer by means of three detent balls 36, (FIGURES 2 and 4) each movable within a separate bore 37 extending radially through the hammer wall. Balls 36 have a diameter in excess of the thickness of the hammer wall and extend into an annular groove 38 surrounding the left hand end of arming pin 35. Accordingly, so long as openings 37 are positioned between the ends of the restricted central portion of bore 29, detent balls 36 cooperate with grooves 38 to hold arming pin 35 coupled to hammer 30. To disengage this coupling, the right hand end of the arming pin projects through a bore 40 in main casing 16 and is secured to a piston 41 reciprocable along arming cylinder 42, arming pin 35 and piston 41 being assembled by removing threaded plug 43 from the exposed end of cylinder 42.

It is pointed out that when the pressurized gas is admitted to the left hand end of cylinder 42 it acts on piston 41 to shift arming pin 35 and hammer 30 to the right to engage groove 45 at the rear end of hammer 30 over edge 46 of a sear pin 47 rotatably supported transversely of relay body 25. For the present it suffices to point out that the described rearward movement of the hammer engages and rotates sear pin 47 clockwise from the position shown in FIGURE 2 sufficiently to permit sear 46 to become seated within groove 45 of the hammer, a condition best shown in FIGURE 3. When the hammer is so positioned with respect to the sear, hammer 30 is held cocked by relay 15 and stiff spring 32 is compressed in readiness to drive the hammer to the left vigorously and at high speed.

Details of the sear assembly will be explained in greater detail presently. Before doing so, it is desired to point out that during the cocking movement of arming pin 35, the gas pressure within arming cylinder 42 acts to carry the arming pin together with the hammer to the right until the detent balls 36 can be cammed outwardly into the enlarged right hand end of bore 29. It is for this reason that groove 45 seating sear 46 is made sufficiently wide to provide adequate lost motion and time for balls 36 to be cammed outwardly into bore 29 by the inclined sidewall of groove 38.

Referring to FIGURES 2 and 3, the pyrotechnic timer means for operating arming device 35 will be described. The right hand end of main housing 16 includes a cylindrical portion 50 threadedly seating at its outer end 51 a cylinder 13. Threaded to the inner end of cylinder 13 is a bushing 52 supporting an explosive cartridge 53 capable when ignited of producing a volume of pressurized gas. Connected to the supported end of explosive charge 53, but not shown, is a detonator having its central area located in the path of travel of a firing pin 54 carried by a piston-like hammer 55. When conditioned for use, hammer 55 is fixably secured by a shear pin 57 to a sleeve 56 slidably supported within cylinder 13. Thus it will be understood that, initially, hammer 55 is located at the rear end of cylinder 13. Hence gas pressure developed in device 11 is communicated through tube 12 against the rear end of hammer 55 and severs shear pin 57 holding the hammer connected to stationary sleeve 56. The armed condition of the hammer is shown in FIGURE 2 whereas the severed condition is shown in FIGURE 3, hammer 55 there having been driven to the forward end of sleeve 56. In the latter view, firing pin 54 has set off the explosive charge within device 53.

The produced gas pressure flows through filter cartridge 60, passage 61 and into cylinder 42. The lower end of gas passage 61 is closed in any suitable manner, as by screw plug 63 provided with an O-ring seal 64. It is also pointed out that O-ring seals are used liberally throughout the device to perform very effective sealing functions.

The trigger components and the operating connections between these, aneroid cell 28 and sear pin 47 will now be described with particular reference to FIGURES 1 to 7. The trigger proper comprises a lever 66 in (FIGURE 1, 6) pivotally supported on a pivot pin 67 extending transversely of main body 25. A lever 66' identical to trigger 66 is similarly supported on the other end of pivot pin 67 for dynamic balance purposes only and has no actual triggering functions. The shorter ends of trigger 66, and lever 66' extending to the left of pin 67 are pivotally connected by a pin 68 to the upper ends of the legs of a U-shaped stirrup or connector 69 having its bight portion 70 brazed or otherwise securely fastened to the upper wall of aneroid cell 28. As best appears from FIGURE 4, stirrup 69 straddles relay housing 25.

Of importance is the fact that the forward longer legs of trigger lever 66, 66' are thicker and heavier and exactly counterbalance the left-hand stirrup 69, pivot pin 68 and end of levers 66, 61'. Owing to this careful counterbalancing, there are no unbalanced forces tending to rotate trigger 66 and member 66' in either direction about pivot 67, a fact playing an important role in the sensitivity and reliability of the relay.

The lower side of aneroid cell 28 has a threaded connection 73 with a shouldered nut 74 supported in a well 75 centrally of the large diameter cap screw 76. Cap screw 76 has a threaded connection 77 with a large diameter assembly opening into one side of main housing 16. In this connection it is pointed out that the uppermost surface 78 of main body 25 (FIGURE 1) is held pressed rigidly assembled against the bottom of cavity 26 by a pair of cap screws 79 threaded downwardly into main body 25.

As is made clear by FIGURE 2, cap screw 76 is closed tightly against the lower side of cavity 26 and provides a firm supporting base for the aneroid cell 28. Accordingly, it will be understood that the position of the cell with respect to cap screw 76 may be adjusted to a limited extent by rotating the nut 81 relative to lock nut 74. By this means it is possible to adjust the cell to release trigger 66 at a predetermined atmospheric pressure or altitude.

The lost motion connection between the free or right-hand end of trigger 66, as viewed in FIGURE 1, and sear pin 47 will now be described, particular reference being had to FIGURES 1, 5, and 7. Referring first to FIGURES 5 and 7, it is pointed out that sear pin 47 is loosely journaled in an opening extending transversely of relay body 25 and rotatably supports an arm 84 on one end. This arm is held in assembled position by a pin 85 having a tight friction fit in a transverse opening through sear pin 47. A split ring keeper 86 seated in a groove at the other end of pin 47 (FIGURE 5) locks the latter assembled to main body 25.

Integral with the outer face of arm 84 is a 90 degree sector-like boss 88 (FIGURES 1, 7), which boss occupies a position between the six and nine o'clock areas at the lower corner of arm 84. The two radial faces of boss 88 cooperate with the opposite ends of pin 85 to limit pivotal movement of arm 84 relative to sear pin 47 and thereby control the position of the sear while permitting limited freedom of pivoting action as will be better understood presently.

Arm 84 and the sear pin itself are resiliently urged in opposite directions by a pair of torsion springs of unequal strength now to be described. The smaller and weaker of the two springs 90 has its upper end seated in an opening in the face of arm 84 as its best shown in FIGURE 7, its opposite end being semi-circular and embracing the lower side of the sear pin with its hooked end seated in a radial opening in this pin. Spring 90 urges pin 47 to rotate counterclockwise relative to arm 84 as viewed in FIGURE 1, and cooperates with pin 85 and boss 88 in resiliently holding arm 84 and sear pin 47 in a predetermined orientation.

A second torsion spring 91 is effective to urge arm 84 and pin 47, as a unit, resiliently against stop pin 92 projecting from the face of relay body 25. To this end the upper end 91a of spring 91 is anchored in body 25, the mid-portion of the spring being coiled about the end of sear pin 47 and its end 91b being anchored in the face of arm 84. Spring 91 will therefore be understood to hold the arm 84 against stop 92 whereas the second spring holds stop pin 85 of the sear pin pressed lightly against the nine o'clock face of the quadrant shaped boss 88 with sear edge 46 positioned as shown in FIGURE 3.

It will therefore be recognized that the described lost motion connection between the sear pin 47 and arm 84 readily permits the sear pin to be rotated clockwise as viewed in the several views and as is necessary to permit cocking of hammer 30 during the arming action. Furthermore, the mutually cooperating light spring positioning action of the two springs also permits the sear pin to rotate counterclockwise from the position shown in FIGURE 1 quite easily and readily except when the right hand end of trigger 66 is in abutment with the upper lateral edge of arm 84, as it is in FIGURE 1. Under these conditions the trigger is engaged with the vertical edge of arm 84 and is effective to lock the firing pin hammer 30 in cocked position. Immediately however, that trigger 66 is rotated counterclockwise upwardly beyond the end of arm 84, sear 46 is free to rotate counterclockwise instantly thereby releasing hammer 30 for high velocity forward movement under the action of stiff spring 32. As the rear end of the hammer overrides the sear, springs 90, 91 cooperate to return arm 84 and sear 46 to its normal position with sear 46 in readiness to again lock the hammer in cocked position.

The release of trigger 66 is accomplished when the ambient external pressure acting on aneroid cell 28 presses the upper wall carrying stirrup 69 toward the stationary pivoting trigger 66 counterclockwise about pivot 67 beyond the upper end of arm 84. The very smooth contacting surfaces of trigger 66 and arm 84, and other factors, enable a very slight effective force to trip the trigger thereby freeing the strong spring 32 to propel hammer 30 forward to perform useful work. In the arrangement shown this work is merely that required to project firing pin 31 of the hammer into the detonator carried at the right hand end of explosive charge 17 detachably supported by threads 95 (FIGURE 1) at the left hand end of main body 16.

Chamber 96 enclosing charge 17 includes filtering device 97 through which the generated high pressure gases flow into a tube 19 leading into the work producing device 20.

A further feature of importance pertaining to relay device 15 includes an altitude indicator needle 100 (FIGURES 2 and 5) rotatable over a scale carried by a dial 101 carried by indicator body 102 and secured to main body 25, as by screws 103. A transparent dial 105 is secured to the rim 106 of body 102 and permits viewing of the indicator needle from the exterior of device 10. Needle 100 is fixed to a rotary shaft 108 provided with a steep pitch thread 109 in which is seated the end of a lever 110. The mid-portion of this lever is operatively connected with pin 68 (FIGURES 2 and 6) interconnecting trigger 66 and stirrup 69, the left hand end of lever 110 being engaged with an adjustable nut 111 threaded over an adjustable screw 112. This screw has a flange 113 bearing against the top surface 78 of relay body 25 (FIGURE 2) and is resiliently held there by an O-ring 115. Accordingly, it will be recognized that rotation of adjusting screw 112 will shift the position of nut 111 along the screw and lever 110. Owing to the steep pitch of thread 109 on indicator shaft 108, this movement of the lever acts to rotate needle 100 along scale 101 which is suitably calibrated to indicate altitude conditions for which aneroid cell 28 has been charged and adjusted.

One of the important functions served by this indicator is to inform installation and servicing personnel at a glance as to whether the device is capable of functioning properly. If it is, then needle 100 should be positioned along scale 101 and indicate to the observer the actual altitude which the aneroid cell is then sensing. If the needle does not so indicate, the observer assumes the aneroid cell is defective or malfunctioning.

Operation of the described embodiment of the invention will be quite apparent from the foregoing detailed description of its individual components and of their principal functions. Assuming that the described device is to be used to control and program the full blossoming of a parachute associated with an ejectable pilot seat of an aircraft, the apparatus functions as follows. Before starting the flight, operating personnel check device 10 to make certain that the relay is properly conditioned and that arming pin 35 is locked to hammer 30 by detent balls 36 in the manner shown in FIGURE 2. It would also be ascertained that explosive charges 17 and 53 are present in their respective chambers and that firing hammer 55 for charge 53 is held in its retracted position by shear pin 57 (FIGURE 2).

So long as device 10 is located below the critical opening altitude for the parachute the right hand end of trigger 66 will be pivoted counterclockwise out of abutting relation with the edge of arm 84. However, whenever device 10 is at an altitude above the critical release altitude, trigger 66 will be free to pivot clockwise into abutting relation with the adjacent longitudinal edge of arm 84. Spring 91 is then effective to hold arm 84 rotated against stop 92 and it is pointed out that, under these conditions, there is very slight clearance between arm 84 and the adjacent end of trigger 66. The trigger is now held steadily in this position to abut arm 84 immediately that arming pin 35 is operated to cock hammer 30.

Let it now be assumed that the pilot wishes to escape from his craft and to this end initiates operation of the automatic seat ejector. The high pressure generated in ejector device 11 for this purpose is communicated through conduit 12 into cylinder 13 of the automatic relay arming device. The pressure is then effective on the end of hammer piston 55 (FIGURE 2) to sever shear pin 57 and to propel hammer 55 to the left causing firing pin 54 to detonate the explosive charge 53. The high pressure gas so generated flows through filter 60 and passage 61 into cylinder 42 propelling piston 41 of the firing pin 35 to the right carrying hammer 30 along with it in opposition to stiff spring 32. As this occurs, the flanged rear end of the hammer overrides sear 46 of sear pin 47, and rotates the latter slightly clockwise in opposition to spring 90. As this occurs to permit sear 46 to enter locking groove 45 of the hammer, detent balls 36 are free to move into the enlargement of bore 29 thereby disconnecting arming pin 35 from hammer 30. Spring 32 now attempts to return the hammer to project hammer 30 forwardly to the left but this action is arrested by the engagement of the side wall of groove 45 with sear 46. Sear pin is held against counterclockwise rotation past its twelve o'clock position by the engagement of its pin 85 with the upper edge of boss 88 on the outer face of arm 84 and by the engagement of the arm 84 with the end of trigger 66.

The parts of the relay are now set or cocked and remain locked in this position as the pilot's seat and attached parachute fall through space, the shrouds of the parachute being understood as restrained against opening, more than partial opening, by a restraining loop. As the falling assembly reaches the altitude for which relay device 15 has been set to operate, the ambient pressure collapses the walls of aneroid 28 toward one another carrying stirrup 69 therewith and pivoting trigger 66 counterclockwise out of engagement with sear arm 84. As will be appreciated from a consideration of FIGURE 1, the load imposed on trigger 66 by spring 32 in the cocked condition of the parts is carried substantially in full by pivot pin 67 and acts to place the right hand end of the trigger in compression. Consequently, only a very small force need be supplied to overcome friction and to disengage trigger from arm 84, or a force readily and accurately supplied from aneroid cell 28. This action releases hammer 30 which is propelled forwardly at high velocity by spring 32 to force firing pin 31 against the detonator for charge 17. As was pointed out above, the detonator may set off a time delay charge effective after a predetermined time interval to fire the main charge 17. This generates high pressure gas which is conducted through conduit 19 into power device 20 which may include a piston, pneumatic motor or other power implement capable of operating a cutting knife to sever the loop restraining the full blossoming of the main parachute.

It is pointed out and emphasized that either the initial charge 53 or charge 17 may include igniting devices compounded in accordance with known techniques to set off the main power charge at a predetermined time following detonation of an initiator igniter by the respective firing pins 31 and 54.

Although the functioning of one preferred embodiment of the invention has been described in connection with the ejection of a pilot and his seat from an aircraft, it will be understood that there are many other typical operating environments for which the invention device is equally or even more suitable. One particularly advantageous use of the described control mechanism is to deploy a first-stage or pilot parachute with certainty and timely precision from a craft traveling in the atmosphere, the deployed first-stage then being effective to deploy one or more main or second-stage parachutes. When so employed, the described control functions in essentially the same manner and sequence outlined in detail above, the principal objective being the use of the main power supply, when released, to propel a projectile from the craft with sufficient force to deploy the pilot parachute. Heretofore, much uncertainty has attended the deployment of the initial or first-stage parachute beyond the slipstream, but such uncertainties and difficulties are avoided by the present mechanism which acts to propel a mass together with the pilot parachute beyond the slipstream with the result that the deployed pilot parachute opens and is then effective to deploy the main parachute.

Referring now to FIGURES 8 and 9, there is shown fragmentary details of a simplified embodiment of the invention, differing primarily in having a manually operable arming device. The same or similar components as described for the main embodiment are indicated by the same reference characters but are distinguished by the addition of a prime. The principal difference resides in the fact that the right hand end of arming pin 35' is provided with an enlargement 120 formed with an annular groove 121. Additionally, the exposed outer end of the arming pin is provided with a transverse pin 124 forming a finger grip by which the arming pin may be grasped by the fingers and pulled rearwardly. Normally, the arming pin is locked in its retracted position corresponding to the position of the arming pin in FIGURE 2 of the first embodiment by means of a safety pin 125. Pin 125 may comprise a hairpin-like loop of wire one leg of which has a snug frictional fit with a bore 126 aligned to extend lengthwise along groove 121 when groove 121 registers with bore 126. The other leg of safety pin 125 may be bent to embrace part of the circular boss surrounding the arming pin thereby preventing accidental withdrawal of the safety pin.

It will be understood that all other components and details of the modified embodiment correspond with the described details of FIGURES 1 to 7. The modified device is used in the same manner described above except that two independent actions performed in sequence must be taken to arm the relay.

The first of these actions is to forcibly withdraw safety pin 125 and cast it aside. Thereafter, pin 124 is grasped and pin 35' is pulled outwardly carrying the firing pin hammer therewith to set the pressure-sensitive relay in the same manner and for the same purposes described in connection with the first embodiment.

While the particular barometrically responsive power control mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. An automatic pressure responsive relay operable to control a power unit with which said relay is adapted to be associated, said relay comprising means movably supporting a work-performing member including means normally substantially unstressed biasing the same to move in one direction, means including sensitive trigger-controlled mechanism for cocking and holding said work-performing member in cocked position in opposition to said biasing means immediately prior to the time of need for said power unit and in readiness to perform work, and pressure sensitive actuator means responsive to a predetermined ambient pressure to disengage said trigger-controlled mechanism and release said work-performing member from the cocked position thereof.

2. A relay as defined in claim 1 characterized in that said trigger-controlled mechanism includes movably supported sear means engageable with said work-performing member to hold the same in cocked position and including rigid arm means having a lost motion connection with said sear means, and pivoted trigger means engageable with said arm means to lock the same in a position to hold said sear means in the cocked position thereof until said arm means is released from said trigger means by said pressure sensitive actuator means.

3. A relay as defined in claim 1 characterized in that provision of indicator means operatively connected with said pressure sensitive actuator means to provide a visually observable indication of the operating condition of said pressure sensitive means.

4. A relay as defined in claim 3 characterized by the provision of protective housing means for said relay and including a transparent window through which said indicator means can be observed.

5. A relay as defined in claim 1 characterized in the provision of protective housing means for said relay and including adjustable means accessible from the exterior thereof for adjusting the pressure at which said pressure sensitive actuator is effective to disengage said trigger means from said arm means.

6. A relay as defined in claim 1 characterized in the provision of means for moving said work-performing member into the said cocked position thereof in opposition to said biasing means.

7. A relay as defined in claim 1 characterized in that said means for cocking said work-performing member includes an automatic actuator operable in response to an operation taking place in other equipment with which said automatic actuator is adapted to be operatively associated.

8. A relay as defined in claim 1 characterized in that said means for cocking said work-performing member includes a manual actuator extending therefrom to a point accessible from the exterior of housing means enclosing said relay.

9. Self-contained means for automatically activating a source of power to perform work at a predetermined altitude comprising power means for performing work when activated, means for activating said power means including an explosive charge, firing pin means for setting off said explosive charge including cocking means for said firing pin means, said cocking means and said firing pin means being normally inactive and substantially free of load until there is an imminent need for activating a source of power, sensitive trigger means for holding said firing pin means cocked when moved to cocked position by said cocking means, and means including an aneroid cell responsive to the ambient pressure at said predetermined altitude to release said trigger means and activate said power means.

10. Self-contained means as defined in claim 9 characterized in that said aneroid cell is arranged to release said trigger means as the ambient pressure increases toward said predetermined pressure.

11. Self-contained means as defined in claim 9 characterized in that said power means includes means storing a charge of energy in a confined space and effective to expand upon being activated to perform work.

12. Self-contained means as defined in claim 9 characterized in the provision of pyrotechnic means for engaging said trigger means with said firing pin means while said self-contained means is traveling in space at an elevation distant from the earth and as an incident of the return journey of said self-contained means toward the earth.

13. A self-contained device for use in initiating a power operation under predetermined conditions while said device is traveling in space, said device including a main body having a normally unstressed means movably supported thereon and biased to move in one direction, pyrotechnic timer means for cocking said unstressed means preliminary to and as an incident to the use of said power and including self-setting sear and trigger means for holding said unstressed means in cocked position and operative to control release movement of said sear means, pressure responsive means effective to permit said trigger means to hold said sear in cocking position under certain pressure conditions and effective as said pressure conditions change and reach a predetermined value to release said trigger means and thereby release said cocked means.

14. A self-contained device as defined in claim 13 characterized in that said pressure responsive means includes an aneroid cell having one wall thereof fixed with respect to said main body and another wall thereby connected to operate said trigger means at a predetermined distance from the earth's surface.

15. A self-contained device as defined in claim 13 characterized in that said sear means includes a sear member supported transversely of the path of movement of normally unstressed means and engageable with detent means carried thereby to hold the latter in cocked position, trigger engaging means having limited lost motion movement relative to said normally unstressed means while locked in engagement with said trigger thereby to permit cocking of said normally unstressed means.

16. A self-contained device as defined in claim 13 characterized in the provision of gage means including a movable indicator visible from the exterior of said device and operatively connected with said pressure responsive means, said gage means being operable to provide a visual indicator to an observer as to whether said pressure responsive means and said trigger means are in a proper operative condition.

17. A self-contained device as defined in claim 13 characterized by the provision of pressure operated means operative from a remote point to move said normally unstressed means into cocked engagement with said sear means.

18. A self-contained device as defined in claim 13 characterized in the provision of a source of stored energy operatively associated with said self-contained device and including means activated by the uncocking of said spring pressed member from said sear means to activate said stored energy for the production of useful work.

19. A self-contained power pack adapted to be conditioned for automatic energization immediately prior to the need for its use and in response to a rise in the ambient pressure to a predetermined value, said power pack including a compactly stored inactive source of power, an explosive charge for activating said power source, a normally de-energized firing pin, pyrotechnically energized cocking means operable to cock said firing pin as an incident to the energization of said power pack and preliminary to the use thereof, pressure sensing means, sear means for holding said firing pin cocked after being moved to cocked position so long as the ambient pressure is below a predetermined value, and trigger means operatively associated with said sear means and with said pressure sensing means and operable to release said firing pin when the ambient pressure rises to said predetermined value.

References Cited in the file of this patent
UNITED STATES PATENTS

| | | |
|---|---|---|
| 2,504,148 | Ogden et al. | Apr. 18, 1950 |
| 2,707,605 | Sieverts | May 3, 1955 |
| 2,743,891 | Gaylord | May 1, 1956 |
| 2,883,909 | Musser et al. | Apr. 28, 1959 |
| 2,892,602 | Servanty | June 30, 1959 |
| 2,937,831 | Mayo et al. | May 24, 1960 |
| 2,960,297 | Cotter et al. | Nov. 15, 1960 |